United States Patent
Yamaguchi et al.

(10) Patent No.: US 12,101,830 B2
(45) Date of Patent: Sep. 24, 2024

(54) BATTERY PACK AND ELECTRIC DEVICE SYSTEM

(71) Applicant: Koki Holdings Co., Ltd., Tokyo (JP)

(72) Inventors: Satoshi Yamaguchi, Ibaraki (JP);
Toshiaki Masumori, Ibaraki (JP);
Hiroyuki Hanawa, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 17/773,040

(22) PCT Filed: Sep. 25, 2020

(86) PCT No.: PCT/JP2020/036447
§ 371 (c)(1),
(2) Date: Apr. 29, 2022

(87) PCT Pub. No.: WO2021/084991
PCT Pub. Date: May 6, 2021

(65) Prior Publication Data
US 2024/0172299 A1   May 23, 2024

(30) Foreign Application Priority Data
Oct. 31, 2019 (JP) ................... 2019-198299

(51) Int. Cl.
*H04W 4/38* (2018.01)
*B25F 5/00* (2006.01)
(Continued)

(52) U.S. Cl.
CPC ............. *H04W 76/10* (2018.02); *H04W 4/70* (2018.02); *H04W 84/18* (2013.01)

(58) Field of Classification Search
None
See application file for complete search history.

(56) References Cited

U.S. PATENT DOCUMENTS 7,346,422 B2 * 3/2008 Tsuchiya ................ B25F 5/00
700/168
7,436,149 B2 * 10/2008 Luo ......................... G06F 1/263
320/115
(Continued)

FOREIGN PATENT DOCUMENTS

| EP | 3064323 | 9/2016 |
|---|---|---|
| EP | 3200313 | 8/2017 |

(Continued)

OTHER PUBLICATIONS

"International Search Report (Form PCT/ISA/210) of PCT/JP2020/036447," mailed on Dec. 1, 2020, with English translation thereof, pp. 1-4.

(Continued)

Primary Examiner — Tuan A Tran
(74) Attorney, Agent, or Firm — JCIPRNET

(57) ABSTRACT

A battery pack is provided with: a battery cell; a control part connected to the battery cell; and a wireless communication part connected to the control part and configured to communicate wirelessly with an external device by means of the control part. The wireless communication part wirelessly connects to an electric device having a motor or to an information terminal as the external device for connection. During the wireless connection, priority connection control is performed to connect to the electric device in a wirelessly connectable state.

20 Claims, 10 Drawing Sheets

(51) Int. Cl.
  *G08C 17/02*   (2006.01)
  *H04W 4/70*    (2018.01)
  *H04W 76/10*   (2018.01)
  *H04W 84/18*   (2009.01)

(56) References Cited

U.S. PATENT DOCUMENTS

| | | | | |
|---|---|---|---|---|
| 7,786,703 | B2* | 8/2010 | Nakao | H01M 10/48 |
| | | | | 320/132 |
| 8,319,475 | B2* | 11/2012 | Choksi | B25F 5/00 |
| | | | | 320/110 |
| 9,189,663 | B2* | 11/2015 | Goren | G08B 21/0291 |
| 9,406,915 | B2* | 8/2016 | White | H02P 29/0241 |
| 9,466,198 | B2* | 10/2016 | Burch | G05F 1/66 |
| 9,723,959 | B2* | 8/2017 | Suzuki | A47L 9/2857 |
| 9,756,402 | B2* | 9/2017 | Stampfl | B23Q 17/00 |
| 9,900,967 | B2* | 2/2018 | Isaacs | H05B 47/19 |
| 9,948,134 | B2* | 4/2018 | Wojcik | H01M 10/46 |
| 10,408,884 | B2* | 9/2019 | Willey | B25F 5/00 |
| 10,950,074 | B2* | 3/2021 | Hoossainy | G07C 9/20 |
| 11,011,053 | B2* | 5/2021 | Huggins | B25F 5/00 |
| 11,143,707 | B2* | 10/2021 | Willey | H02J 7/0047 |
| 11,316,211 | B2* | 4/2022 | Morris | H02J 50/10 |
| 11,386,774 | B2* | 7/2022 | Huggins | B25F 5/00 |
| 11,890,738 | B2* | 2/2024 | Huggins | B25F 5/00 |
| 2014/0304939 | A1 | 10/2014 | Suzuki | |
| 2019/0067756 | A1* | 2/2019 | Lee | H01M 10/441 |
| 2024/0123592 | A1* | 4/2024 | Huggins | H01M 10/425 |

FOREIGN PATENT DOCUMENTS

| | | |
|---|---|---|
| EP | 3416355 | 12/2018 |
| JP | 2010081425 | 4/2010 |
| JP | 2012156691 | 8/2012 |
| JP | 2016201354 | 12/2016 |
| JP | 2019000953 | 1/2019 |
| JP | 2019181684 | 10/2019 |
| WO | 2016042973 | 3/2016 |

OTHER PUBLICATIONS

"Search Report of Europe Counterpart Application", issued on Feb. 23, 2023, pp. 1-5.

* cited by examiner

BATTERY PACK AND ELECTRIC DEVICE SYSTEM

CROSS-REFERENCE TO RELATED APPLICATION

This application is a 371 application of the International PCT application serial no. PCT/JP2020/036447, filed on Sep. 25, 2020, which claims the priority benefits of Japan Patent Application No. 2019-198299, filed on Oct. 31, 2019. The entirety of each of the above-mentioned patent applications is hereby incorporated by reference herein and made a part of this specification.

TECHNICAL FIELD

The present invention relates to a battery pack, particularly to a battery pack configured to be able to operate in an interlocked manner with any other electric device by using wireless communication. The present invention also relates to an electric device system using the battery pack.

RELATED ART

There has been proposed a system in which an electric tool being an electric device is equipped with a proximity wireless communication device so as to be able to exchange information with another electric device or to control driving of another electric device. For example, there is a system as follows. In order to suck dust generated during work using an electric device such as a circular saw or a jigsaw with another electric device such as a dust collector, when the electric device and the dust collector are connected by a dust collection hose, start and stop on the circular saw side may be transmitted to the another electric device side via wireless communication. In such interlocking work, for an electric device (for example, a circular saw or a jigsaw) serving as a master, another electric device (for example, a dust collector or a blower fan) serving as a slave is prepared, and the slave electric device is operated in an interlocked manner with operation of the master electric device (Patent Document 1).

In order to use proximity wireless communication, it is necessary that both electric device bodies be equipped with a proximity wireless communication device. However, existing electric device bodies are unable to perform an interlocking operation using proximity wireless communication. Hence, a system is considered in which a proximity wireless communication device is mounted on a battery pack side so as to enable an electric device body having no wireless communication means to perform an interlocking operation with another electric device or information terminal.

Prior-Art Documents

PATENT DOCUMENTS

Patent Document 1: WO 2016/042973

SUMMARY OF THE INVENTION

Problems to be Solved by the Invention

If a battery pack equipped with a wireless communication means performs wireless communication with another electric device body (for example, a dust collector or an information terminal device), a communication path with only a counterpart registered by a predetermined procedure, so-called a one-to-one (1:1) communication path, must be established to achieve a connected state. In a trial state of connection establishment (so-called pairing) of this communication path, if multiple electric device bodies in a wirelessly communicable state are present nearby, a problem arises that it is not known which device has been connected. In other words, if multiple electric device bodies are present, a problem arises that it is not known which device body is to be connected.

The present invention has been made in view of the above background, and an object thereof is to provide a battery pack and an electric device system configured to be able to connect to a target electric device at the time of establishing a communication path for wireless interlocking work. Another object of the present invention is to provide a battery pack and an electric device system configured to perform priority connection control at the time of establishing a communication path for interlocking work. Yet another object of the present invention is to store in advance information for performing priority connection control in a battery pack that may serve as a peripheral or a central at the time of establishing a communication path for interlocking work.

Means for Solving the Problems

Representative features of the invention disclosed herein will be described as follows. According to one feature of the present invention, a battery pack includes: a battery cell; a control part, connected to the battery cell; and a wireless communication part, connected to the control part and configured to perform wireless communication with an external device by the control part. In a state in which an information terminal as the external device and an electric device including a load part as the external device are wirelessly connectable to the battery pack (wireless communication part), the battery pack (wireless communication part) gives priority to establishing wireless connection with the electric device over the information terminal. The battery pack includes a first operation part that switches to a wireless connection standby state. The external device includes a second operation part that switches to the wireless connection standby state. While the information terminal is in the wireless connection standby state in a range enabling wireless connection with the battery pack (wireless communication part), in response to the electric device being switched to the wireless connection standby state by operation of the second operation part in the range enabling wireless connection with the battery pack (wireless communication part), the battery pack (wireless communication part) establishes wireless connection with the electric device without establishing wireless connection with the information terminal. The battery pack connects with the information terminal if the electric device is not within a wireless communication range. If the electric device and the information terminal are in the wireless communication range, the battery pack preferentially connects to one that has been connected in the past.

According to another feature of the present invention, a battery pack includes: a battery cell; a control part, connected to the battery cell; and a wireless communication part, connected to the control part and controlled to perform one-to-one wireless communication with an external device by the control part. The wireless communication part is configured to perform connection in descending order of priority of the external device to be connected. The external device is an electric device including a load part, or an information terminal, and is configured to give priority to connecting with the electric device over the information terminal. The battery pack includes an operation part that gives a wireless connection instruction for the wireless communication part, and is configured to establish a connection path with the external device by operation of the operation part. Further, in establishing the connection path, the battery pack is configured to change a connection condition with the external device depending on an elapsed time from when the operation part is operated.

According to another feature of the present invention, the connection condition includes at least one of: a first connection condition for permitting connection with a portion of the external device during a period from when the operation part is operated until a first predetermined time elapses; a second connection condition for permitting connection with another portion of the external device during a period from when the first predetermined time elapses until a second predetermined time elapses; and a third connection condition for permitting connection with yet another portion of the external device during a period from when the second predetermined time elapses until a timeout occurs. The battery pack is provided with a non-volatile storage device, and is configured to store in advance a list indicating the connection conditions in the storage device.

According to yet another feature of the present invention, in response to a failure to connect with the external device during a period from when a procedure for establishing the connection path is started until a timeout time later than the second predetermined time, the battery pack is configured to be returned to a standby state before operation of the operation part. This connection condition includes a manufacturer code, and the external device that does not match the manufacturer code or does not correspond to a specific code is configured not to be connected. The connection condition includes target device information and target function information. Whether connection is permitted or not is configured to be first determined based on the target device information, and if not permitted, whether connection is permitted or not is configured to be determined based on the target function information. As described above, an electric device system is constructed by a battery pack including a wireless communication part and an external electric device including a wireless communication part.

Effects of the Invention

According to the present invention, when multiple connectable external devices are present, a target external device can be reliably connected. Since which external device should be preferentially connected can be determined on the battery pack side, a most suitable connection counterpart can be first connected. If no preferential connection counterpart is present, since control is performed so that an external device having a low priority can also be connected, it is possible to connect to a mobile terminal that may monitor a state of the battery pack. Information for performing priority connection can be stored in advance in the battery pack.

DESCRIPTION OF THE EMBODIMENTS

Embodiment 1

Figure 1:
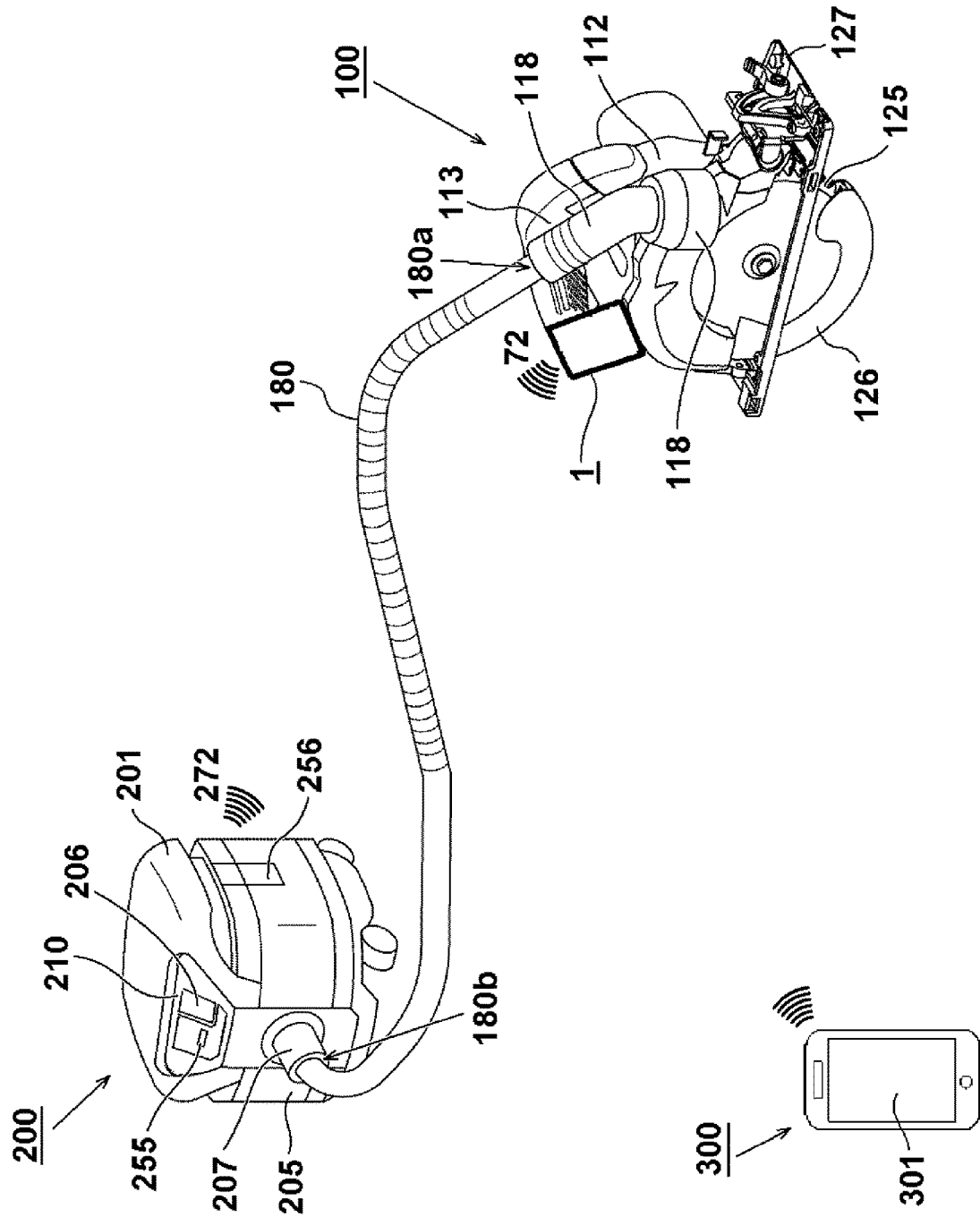
FIG. 1 is a perspective view showing a wireless interlocking system of an electric device according to an embodiment of the present invention.

Hereinafter, an embodiment of the present invention is described based on the drawings. In the following drawings, the same portions are designated by the same reference numerals, and repeated description will be omitted. In the present specification, an electric tool operated by a battery pack will be described as an example of an electric device.

FIG. 1 is a perspective view showing a wireless interlocking system of an electric device according to an embodiment of the present invention. The wireless interlocking system is configured as an electric device system by an electric device body (here, circular saw 100) on which a battery pack 1 is mounted and an electric device (in the example of FIG. 1, dust collector 200 and information terminal 300) cooperating therewith.

The circular saw 100 is a tool for cutting an object to be cut such as wood, in which a saw blade 125 as a working device that has a disk shape and has multiple spire-shaped blades formed on an outer peripheral side is rotated at high speed by a motor (not shown). As a power supply of the circular saw 100, one using a commercial power supply and one using a battery are widely known. In the present embodiment, the battery pack 1 (to be described later in FIG. 2) of a removable type is used. A handle 113 to be held by an operator is formed on an upper part of a housing 112 of the circular saw 100. A trigger lever (not shown) for operating a motor switch is provided on a lower front side of the handle 113. By the operator pressing a base 127 and the saw blade 125 against the object to be cut and pulling the trigger lever, the object to be cut can be cut in a straight line. Approximately an upper half near an outer peripheral edge of the saw blade 125 is covered by the housing 112. Around approximately a lower half of the saw blade 125, a protective cover 126 is provided that protects a blade of the saw blade 125 from being exposed when the saw blade 125 is not pressed against the object to be cut.

When the wood is subjected to cutting work by the circular saw 100, a large amount of sawdust is generated during cutting. The portion of approximately the upper half of the saw blade 125 covered by the housing 112 functions to prevent scattering of dust such as sawdust. A duct adapter 118 can be attached to a portion of the housing 112. The duct adapter 118 forms a suction passage for sucking the dust generated by the cutting work together with the surrounding air, and an air passage from an inner portion of the housing 112 to the duct adapter 118 is formed so that a connection pipe line extends radially outward from the vicinity of a portion of the outer peripheral edge of the saw blade 125. A tip 180a of a flexible dust collection hose 180 can be connected to the duct adapter 118.

The dust collector 200 includes a tank 205 and a head 201 separable from each other. The head 201 is detachably fixed to an upper part of the tank 205 by a clamp mechanism 256. The dust collector 200 is an electric device as follows. A dust collection fan (not shown) is rotated by a motor provided on the head 201 and a negative pressure is created inside the dust collection hose 180. Chips or dust generated during the cutting work is sucked together with air from the inside of a duct adapter 207 connected to a tip 180b of the dust collection hose 180, the air is separated from the chips or dust by an air filter (not shown), and only the chips or dust is collected into a container. An operation display part 210 of the dust collector 200 is provided with a main switch 206. When the main switch 206 is switched on, the motor is started (in a single action mode). When the motor rotates, dust collection work is started, and dust or the like can be sucked through the dust collection hose 180. When the operator switches off the main switch 206, the motor stops and the dust collection also stops. The dust collector 200 can be used not only in the single action mode of operating independently, but also in an interlocking operation as a slave of another electric device as shown in FIG. 1. In that case, by mounting the tip 180b of the duct collection hose 180 on the duct adapter 207 and operating a pairing switch 255 being a second operation part dedicated to the operation display part 210, the dust collector 200 is switched from the "single action mode" to an "interlocking mode". That is, by operating the pairing switch 255, the dust collector 200 is switched to a wireless connection standby state in which wireless connection with an external device (for example, battery pack 1) is possible. At this time, in the battery pack 1 on the circular saw 100 (as a master electric device) side, by pressing and holding a switch button 85 (see FIG. 2) being a first operation part, the battery pack 1 is switched from the "single action mode" to the "interlocking mode". That is, by pressing and holding the switch button 85, the battery pack 1 is switched to the wireless connection standby state in which wireless connection with an external device is possible. Then, in a state in which both devices are located in a range enabling wireless connection, if both devices are switched to the "interlocking mode" (wireless connection standby state) with each other, the circular saw 100 and the dust collector 200 are automatically paired and registered to be in a wirelessly connected state in which wireless interlocking is possible.

In this way, the two electric devices are operated in an interlocked manner, the main work (cutting work by the circular saw 100) is performed by the electric device on one side (master side), and subordinate work (suction and collection work of dust generated by the circular saw 100) is performed by the electric device on the other side (slave side). Each electric device (circular saw 100 and dust collector 200) is provided with a communication part performing wireless communication. However, in the present embodiment, wireless communication 72 is not performed by the body side of the master electric device (circular saw 100) but by the battery pack 1 mounted thereon. Here, Bluetooth (a registered trademark of Bluetooth SIG, Inc. USA) is used as a short-range wireless means. In the interlocking mode, when a trigger switch of the circular saw 100 is switched on, an operation instruction signal is sent from a communication part 70 (wireless communication part) of the battery pack 1 to the dust collector 200. The dust collector 200 receives the operation instruction signal, starts the motor and starts the dust collection work. When the trigger switch of the circular saw 100 is switched off, since the operation instruction signal from the communication part 70 of the battery pack 1 disappears, the dust collector 200 stops the motor immediately or after being applied with a predetermined time lag, and stops the dust collection. In this way, in the present embodiment, since an interlocking operation is performed between multiple electric devices by using wireless communication, it is possible for the electric devices to easily operate in an interlocked manner without using a signal code for transmitting the operation instruction signal.

The information terminal 300 is a smartphone or a portable information terminal. The information terminal 300 is provided with, in addition to a public telephone communication network or/and the Internet, a short-range wireless means (wireless communication part) having a short communication distance. It is possible for the battery pack 1 to be paired not only with the dust collector 200 but also with the information terminal 300. Here, "pairing" is work of registering an electric device (such as dust collector 200 and information terminal 300) in association with the battery pack 1 side by using wireless communication. By performing the registration work (pairing) of the above, the electric device (such as dust collector 200 and information terminal 300) is able to acquire necessary information from the battery pack 1 paired therewith. A relationship between the paired parties is that a ratio of number of terminal devices such as users A and B to number of battery packs is 1:1.

The battery pack 1 is configured to output, for example, 18 V direct current. In the present embodiment, the information terminal 300 is able to read information about the battery pack 1 by directly communicating with the battery pack 1. The communication between the information terminal 300 and the battery pack 1 can be performed not only when the battery pack 1 is mounted on the electric device body but also in a state in which the battery pack 1 has been removed from the electric device body.

The information terminal 300 processes the information received from the battery pack 1 by wireless communication, and manages battery remaining capacity or life prediction or the like for the battery pack 1 from the information. The information terminal 300 includes a liquid crystal display 301 being a touch type input/output device. Application software (hereinafter referred to as "application") for enabling communication with the battery pack 1 of a specific type is installed in advance on the information terminal 300. This application includes software that pairs the information terminal 300 with the battery pack 1, software that uploads the information acquired from the battery pack 1 to a support company, and software for displaying a state of the battery pack 1. The application is available from a manufacturer or the like via a telephone line or a network.

Figure 2:
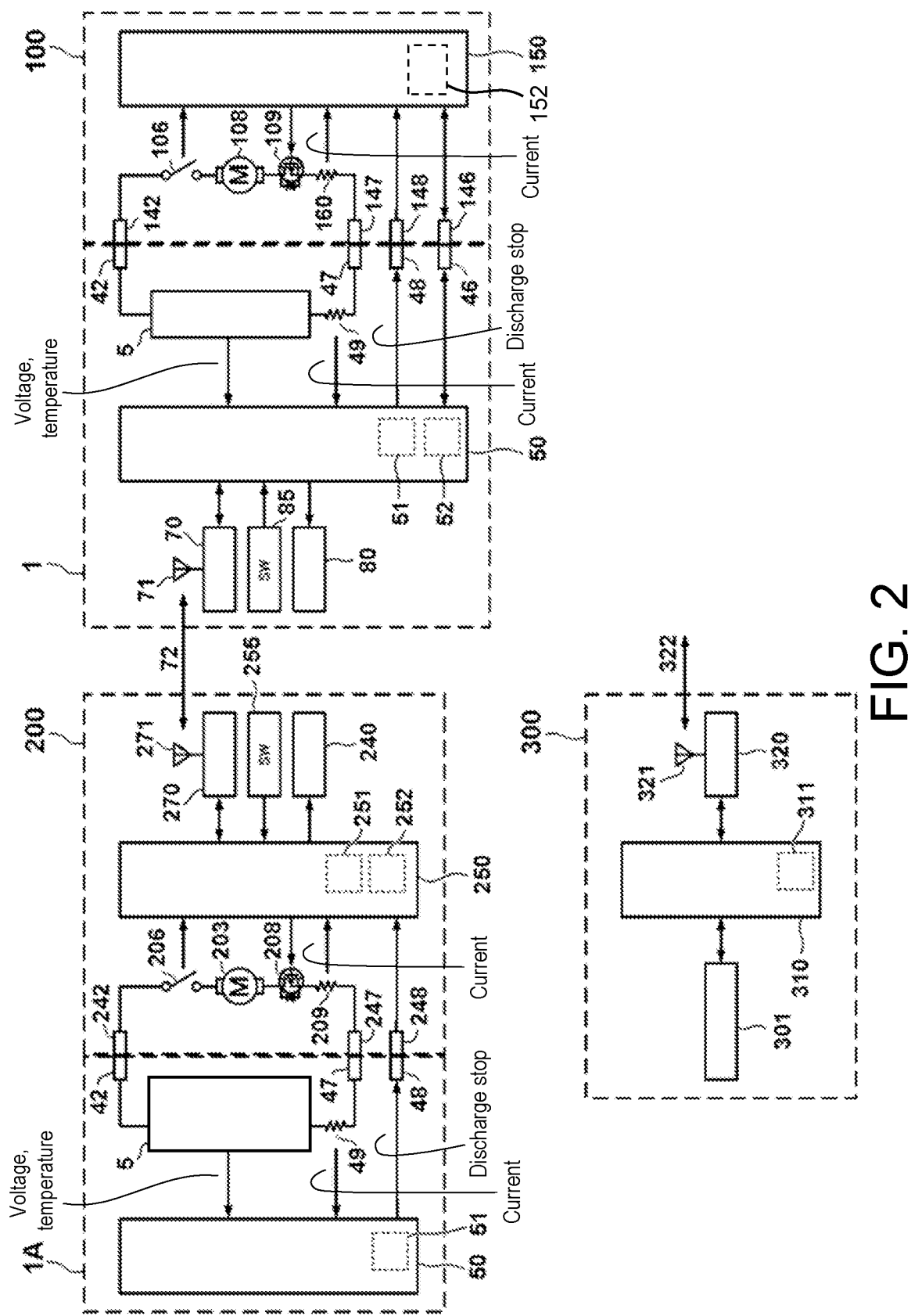
FIG. 2 is a schematic block view showing a circuit configuration of each electric device (circular saw 100, dust collector 200, and information terminal 300) in a wireless interlocking system of the present embodiment.

FIG. 2 is a schematic block view showing a circuit configuration of each electric device (circular saw 100, dust collector 200, and information terminal 300) in the wireless interlocking system of the present embodiment. In the battery pack 1, a secondary battery 5 is housed in a case made of synthetic resin. Charging and discharging of the secondary battery 5 are controlled by a control part 50. The control part 50 is connected to the secondary battery 5. The control part 50 includes a one-chip MICOM (microcomputer) 51 and a storage device 52. The storage device 52 stores a program in advance, and also stores connection condition information 510 to be described later in FIG. 6. The control part 50 has an arbitrary hardware configuration. As the storage device 52, a non-volatile memory built in the MICOM 51 or provided separately from the MICOM 51 may be used.

The MICOM 51 is connected to the secondary battery 5, and monitors a state (for example, voltage, current, or battery cell temperature) of the secondary battery 5. The voltage is detected by a voltage checking means (voltage detector) to be described later. The current is detected by a shunt resistor 49 serving as a current detector connected in series with the secondary battery 5. The temperature is detected by a temperature detector (not shown), for example, a thermistor, provided in the vicinity of the secondary battery 5. The voltage, current and temperature detected are input to the MICOM 51 of the control part 50. When the voltage of the secondary battery 5 falls below a specified lower limit, a discharge stop signal is sent to a control part 150 on the circular saw 100 side via LD terminals 48 and 148 serving as abnormality signal terminals. The MICOM 51 performs communication with the circular saw 100 via T terminals 46 and 146 serving as communication terminals. Each other's model information (such as model name and rated voltage) is transmitted and received via the communication terminals, and which model was used is stored as a history in the storage device 52 and a storage device 152 of the control part 150. The communication part 70 using Bluetooth® is provided in the battery pack 1. An antenna 71 is connected to the communication part 70. The communication part 70 is connected to the control part 50, and the wireless communication 72 by the communication part 70 is managed by the MICOM 51. The MICOM 51 transmits a signal to the circular saw 100 or the like or an external charger (not shown) by using a V terminal and an LS terminal serving as other communication terminals (not shown). It is also possible to constitute multiple communication terminals by a single communication terminal.

The secondary battery 5 is housed in the battery pack 1. In the secondary battery 5, five lithium-ion battery cells having a rated voltage of 3.6 V are connected in series, and power having a rating of 18 V is supplied to a positive electrode terminal 42 and a negative electrode terminal 47. The battery pack 1 is equipped with the voltage checking means (voltage detector) (not shown). When the switch button 85 of the voltage checking means is switched on, during operation, the voltage of a battery cell is applied to a voltage dividing resistor constituting the voltage checking means, a divided voltage is applied to an A/D input port of the MICOM 51, and the MICOM 51 converts the voltage into a digital value, thereby calculating or measuring a voltage between terminals of the secondary battery 5 (overall voltage of the secondary battery 5 in which five battery cells are connected in series). A display part 80 is composed of multiple LEDs, and displays the voltage (capacity) of the secondary battery 5 when the switch button 85 is operated. The MICOM 51 divides a measured voltage into five stages (0, 1, 2, 3, and 4), and controls the display part 80 so that the LEDs in the number corresponding to the stage are lit. The LEDs are lit only for about a few seconds after the switch button 85 is switched on. In this way, since the voltage checking means is provided in the battery pack 1, it is possible to check the battery remaining capacity when the battery pack 1 is removed from the electric device body. It is also possible to transmit the voltage information measured by the communication part 70 to another electric device (for example, information terminal 300).

A motor 108 serving as a discharge load part is provided in the circular saw 100 and drives the working device (here, saw blade 125 shown in FIG. 1) (not shown). The circular saw 100 includes the control part 150 including a microcomputer. In a power path from a positive electrode terminal 142 to a negative electrode terminal 147, a trigger switch 106, the motor 108, a switching element 109 such as a field-effect transistor (FET) serving as a cutoff part, and a shunt resistor 160 serving as a current detector are interposed. The trigger switch 106 is operated by the operator in order to instruct the saw blade 125 to rotate. When the trigger switch 106 is switched on, the motor 108 rotates. The type of the motor 108 used is arbitrary, and a brushed DC motor or a brushless DC motor can be used. The control part 150 controls rotation of the motor 108. When an abnormality occurs, the control part 150 brings the switching element 109 into a cutoff state and prevents (stops) the motor 108 from rotating. When the discharge stop signal is transmitted from the battery pack 1 via the LD terminal 148 as the abnormality signal terminal, the control part 150 prohibits (stops) the motor 108 from rotating by switching off the switching element 109. Also in the case where the shunt resistor 160 detects that an overcurrent has flowed in the power path, the control part 150 switches off the switching element 109 and stops the motor 108 from rotating. As described above, since no wireless communication part is provided on the circular saw 100 side, communication with an external electric device (dust collector 200 or information terminal 300) is performed using the communication part 70 of the battery pack 1 mounted on the circular saw 100.

In the dust collector 200, a motor 203 serving as a discharge load part is driven by using a battery pack 1A. Rotation control of discharge load by the motor 203 is performed by a control part 250. The dust collector 200 is provided with a communication part 270 (device-side wireless communication part) for Bluetooth®. The communication part 270 includes an antenna 271, and performs the wireless communication 72 with a paired and registered external device by control of the control part 250. The control part 250 includes a storage device 252 and appropriately stores information used when establishing pairing with the external device (battery pack 1) and information transmitted and received after pairing. As shown in FIG. 1, the dust collector 200 is provided with the pairing switch (SW) 255. By the operator pressing the pairing switch 255, a pairing setting procedure by the control part 250 (to be described later in FIG. 5) is started. Connection terminals of the dust collector 200 include a positive electrode terminal 242, a negative electrode terminal 247, and an LD terminal 248. In addition, a terminal for signal transmission is provided as in the circular saw 100, but description thereof is omitted herein. The dust collector 200 includes the main switch 206 operated in order to drive the motor 203, a switching element 208 such as an FET that is connected in series with the motor 203 and the main switch 206 and serves as a cutoff part, and a shunt resistor 209 serving as a current detector that detects a current flowing in a power path from the positive electrode terminal 242 to the negative electrode terminal 247. Since their functions are the same as those provided in the circular saw 100, detailed description thereof is omitted. The main switch 206 is operated by the operator when driving the dust collector 200 in the single action mode in which the dust collector 200 is driven independently. On the other hand, if in the interlocking mode, the main switch 206 may be switched on when the pairing switch 255 is operated at the time of switching from the single action mode to the interlocking mode, or may be switched on in an interlocked manner with wireless communication from the battery pack 1, that is, operation of the trigger switch 106 of the circular saw 100.

The battery pack 1A has a conventional configuration with no wireless communication part, and has the same configuration as the battery pack 1 except for not including the communication part 70 and the switch button 85. Since the portions having the same configuration are designated by the same reference numerals, repeated description will be omitted. The battery pack 1A does not further include a display part (corresponding to the display part 80 of the battery pack 1). However, a display part may be provided.

By the above configuration, the communication part 70 of the battery pack 1 and the communication part 270 of the dust collector 200 are able to perform bidirectional communication (wireless communication) 72. By wireless communication, the dust collector 200 is able to receive an operation signal (signal indicating the start of the motor 108 of the circular saw 100 or signal indicating the stop of the motor 108 of the circular saw 100) from the battery pack 1, and is able to start or stop the motor 203 of its own.

The information terminal 300 includes a control part 310 including a MICOM (microcomputer) 311, and the MICOM 311 displays necessary information on a display 301. The display 301 functions as an output device displaying information and as an input device for inputting an operation. The information terminal 300 is provided with a communication part 320 (terminal-side wireless communication part) for Bluetooth®, and an antenna 321 is connected to the communication part 320. Wireless communication 322 between the battery pack 1, the electric device (dust collector) 200, and the information terminal 300 can be performed within a predetermined wireless communication range. If outside the wireless communication range (for example, if a distance between the devices is too long), wireless communication is disabled.

Figure 3:
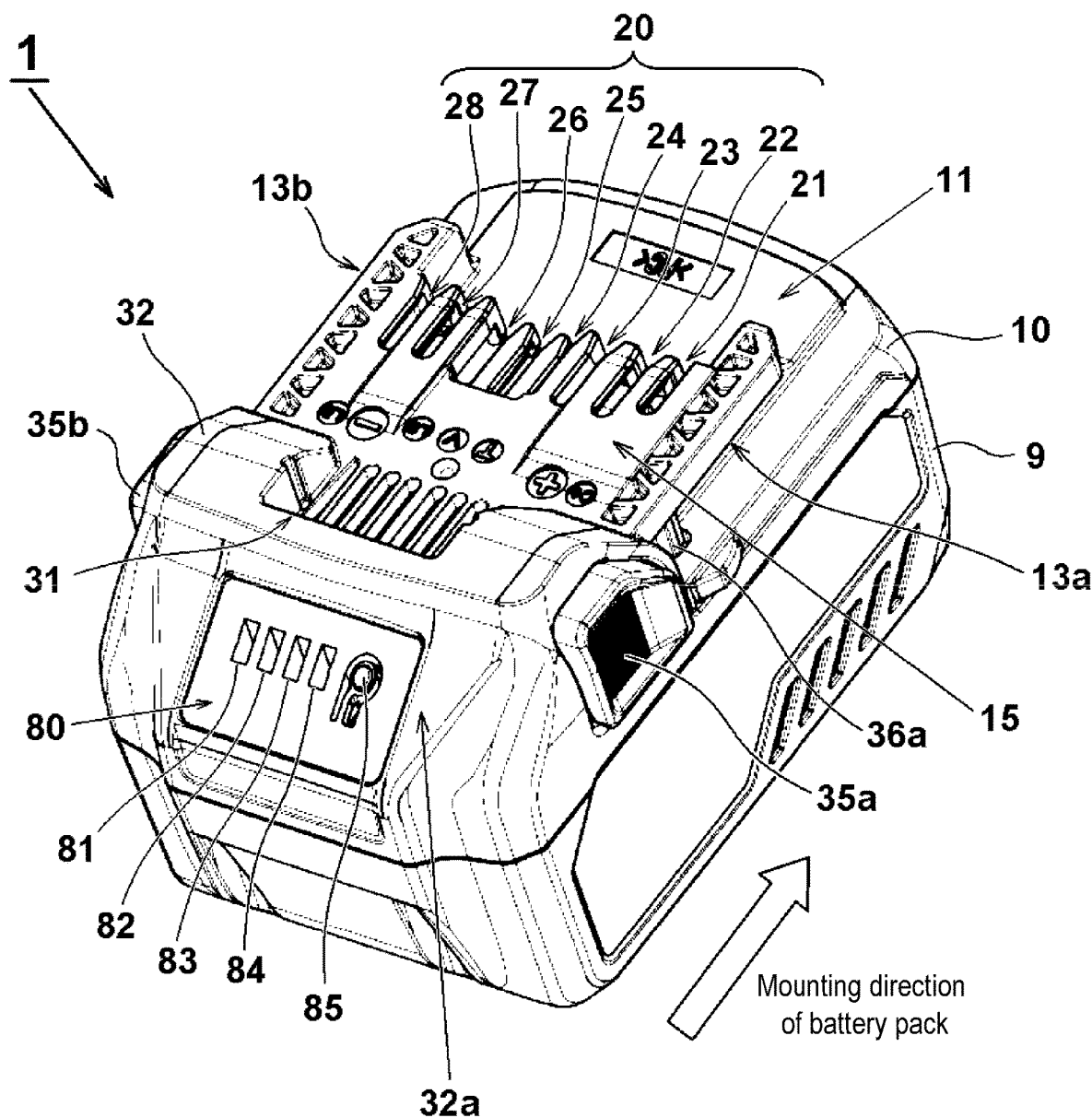
FIG. 3 is a perspective view of a battery pack 1 of the present invention.

FIG. 3 is a perspective view of the battery pack 1 according to an embodiment of the present invention. A housing of the battery pack 1 is formed by a lower case 9 and an upper case 10 that can be divided in an up-down direction. In the upper case 10, a mounting mechanism is formed in which two rails 13a and 13b are formed to attach to a battery pack mounting part of the circular saw 100. The rails 13a and 13b are formed so as to extend in a direction parallel to a mounting direction of the battery pack 1 and to project to left and right side surfaces of the upper case 10. The rails 13a and 13b have a shape corresponding to a rail groove (not shown) formed in the battery pack mounting part of the circular saw 100. With the rails 13a and 13b fitted to the rail groove on the electric device body side, the battery pack 1 is fixed to the circular saw 100 by locking by a locking part 36a serving as a claw of a latch 35a. When the battery pack 1 is removed from the circular saw 100, by pressing the latches 35a and 35b on both the left and right sides, the locking parts 36a and 36b (36b is not visible in FIG. 3) are moved inward and released from the locked state with the body side of the circular saw 100. Thus, the battery pack 1 is moved to a side opposite the mounting direction in that state.

A lower surface 11 and an upper surface 15 of the upper case 10 are formed so as to be at different heights in a stepped manner. A slot group 20 is provided extending rearward from a connecting portion between the lower surface 11 and the upper surface 15. Eight slots 21 to 28 are formed in the slot group 20. The slots 21 to 28 are portions cut out so as to have a predetermined length in the battery pack mounting direction. Inside these cut-out portions, multiple connection terminals (connection terminal group) that can be fitted with a device-side terminal of the circular saw 100 or the external charger (not shown) are arranged.

In the slots 21 to 28, the slot 21 close to the rail 13a on the right side of the battery pack 1 serves as an insertion port for a positive electrode terminal (C+ terminal) for charging, and the slot 22 serves as an insertion port for a positive electrode terminal (+ terminal) for discharging. The slot 27 close to the rail 13b on the left side serves as an insertion port for a negative electrode terminal (− terminal). Between a positive electrode terminal and a negative electrode terminal, multiple signal terminals for signal transmission between the battery pack 1 and the circular saw 100 or the external charger (not shown) are arranged. Here, four slots 23 to 26 for signal terminals are provided between power terminal groups. The slot 23 is a spare terminal insertion slot, and no terminal is provided therein in the present embodiment. The slot 24 is an insertion slot for a T terminal for outputting a signal serving as identification information of the battery pack 1 to an electric tool body or a charger. The slot 25 is an insertion port for a V terminal for inputting a control signal from the external charger (not shown). The slot 26 is an insertion port for an LS terminal for outputting battery temperature information by a thermistor (temperature sensitive element) (not shown) provided in contact with the cell. On the left side of the slot 27 serving as the insertion port for the negative electrode terminal (−terminal), a slot 28 for an LD terminal outputting an abnormality stop signal by a battery protection circuit (not shown) included in the battery pack 1 is further provided.

On the rear side of the upper surface 15, a bulge 32 is formed so as to be raised. A stopper 31 having a recessed shape is formed near the center of the bulge 32. The stopper 31 serves as a contact surface when the battery pack 1 is mounted on the battery pack mounting part on the electric device body side. When the battery pack 1 is mounted in a predetermined position on the circular saw 100, multiple terminals (device-side terminals) arranged in the circular saw 100 and multiple connection terminals arranged in the battery pack 1 come into contact with each other to achieve a conductive state.

The display part 80 is provided on a rear slope 32a of the battery pack 1. The display part 80 is provided with four display windows 81 to 84, and the switch button 85 of a push button type is provided on the right side of the display window 81. The switch button 85 is an operation part operated by the operator. A light-emitting diode (LED) (not shown) is arranged inside the display windows 81 to 84 and lights the inside of the display windows 81 to 84. The entire display part 80 is covered with a laminated film. The display windows 81 to 84 are configured by making a portion of a printed laminated film transparent or translucent so that light can be transmitted therethrough. The switch button 85 is a button operated by the operator. When the switch button 85 is pressed, a display on the display windows 81 to 84 is performed according to the battery remaining capacity of the battery pack 1.

Figure 4:
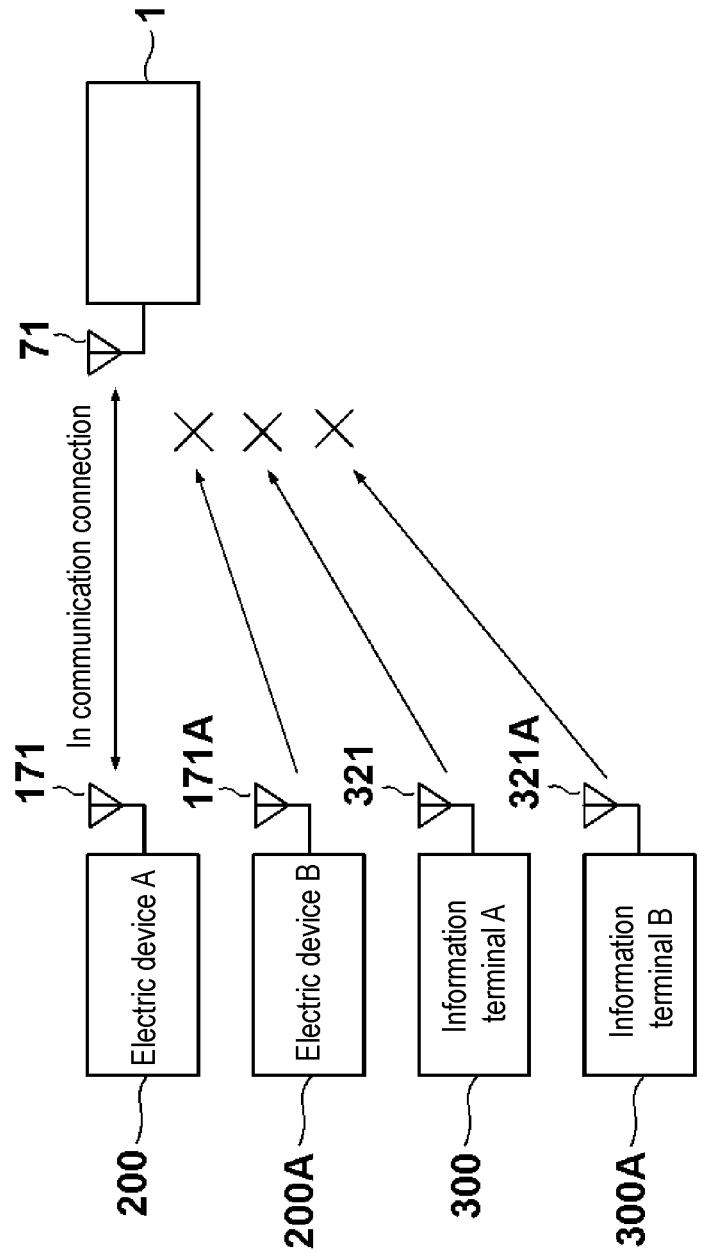
FIG. 4 is a block view showing an establishment state of a wireless communication path in the battery pack of FIG. 3.

FIG. 4 is a block view showing an establishment state of a wireless communication path in the battery pack 1 of FIG. 3. Here, a state is shown in which one battery pack 1 is connected to an electric device A (dust collector 200) among multiple electric devices A and B as well as information terminals A and B that include a wireless communication means. The battery pack 1 includes the communication part 70 (see FIG. 2), and is in a state of being connectable to any of the multiple electric devices A and B as well as information terminals A and B by using the antenna 71 connected to the communication part 70. In the present embodiment, a wireless communication path is on the premise of one-to-one (1:1) connection. Based on the battery pack 1, in principle, a communication path is established on a first-come, first-served basis with the electric devices A and B and the information terminals A and B that can be connected by Bluetooth®. With a one-to-one connection configuration like this, there are merits such as simplified connection processing on the battery pack 1 side, less memory consumption for connection management on the battery pack 1 side, and low cost. In wireless communication between the battery pack 1 and the electric device A or B of the present embodiment, since there is no means of confirming which counterpart is being connected, such as a screen showing a state of wireless communication, a malfunction or misuse may be caused if the battery pack 1 is able to connect to multiple counterpart electric devices. For example, while the battery pack 1 intends to use a function for cooperating with the electric device A, there is a risk that a function of cooperating with the electric device B may operate. In addition, the following situation may occur. While it is intended to turn off the power of the electric device A and end the use of the battery pack 1 together with the electric device A, the battery pack 1 may be switched to connection with the electric device B and the power of the battery pack 1 may continue to be consumed.

In the present embodiment, when multiple electric devices or information terminals are in a connection attempt state, control is performed so that it is clear to which electric device or information terminal the battery pack 1 should connect (is to be connected). Here, there are three points. First, a priority is set for a connection target, and connection is performed from a target with a relatively high priority. Second, when a connection procedure of the battery pack 1 is started, the connection attempt state is achieved. After shift to the connection attempt state, the battery pack 1 is made connectable only to a target with a priority of "high" for a predetermined time. When the predetermined time elapses, the battery pack 1 is made connectable to a target with a priority of "medium" or higher. Further, when the predetermined time elapses, the battery pack 1 is made connectable to all targets. Third, the priority is to be increased for an electric device and decreased for an information terminal, is set at the time of design and development of the battery pack 1 and stored in advance in an internal memory of the battery pack 1.

Figure 5:
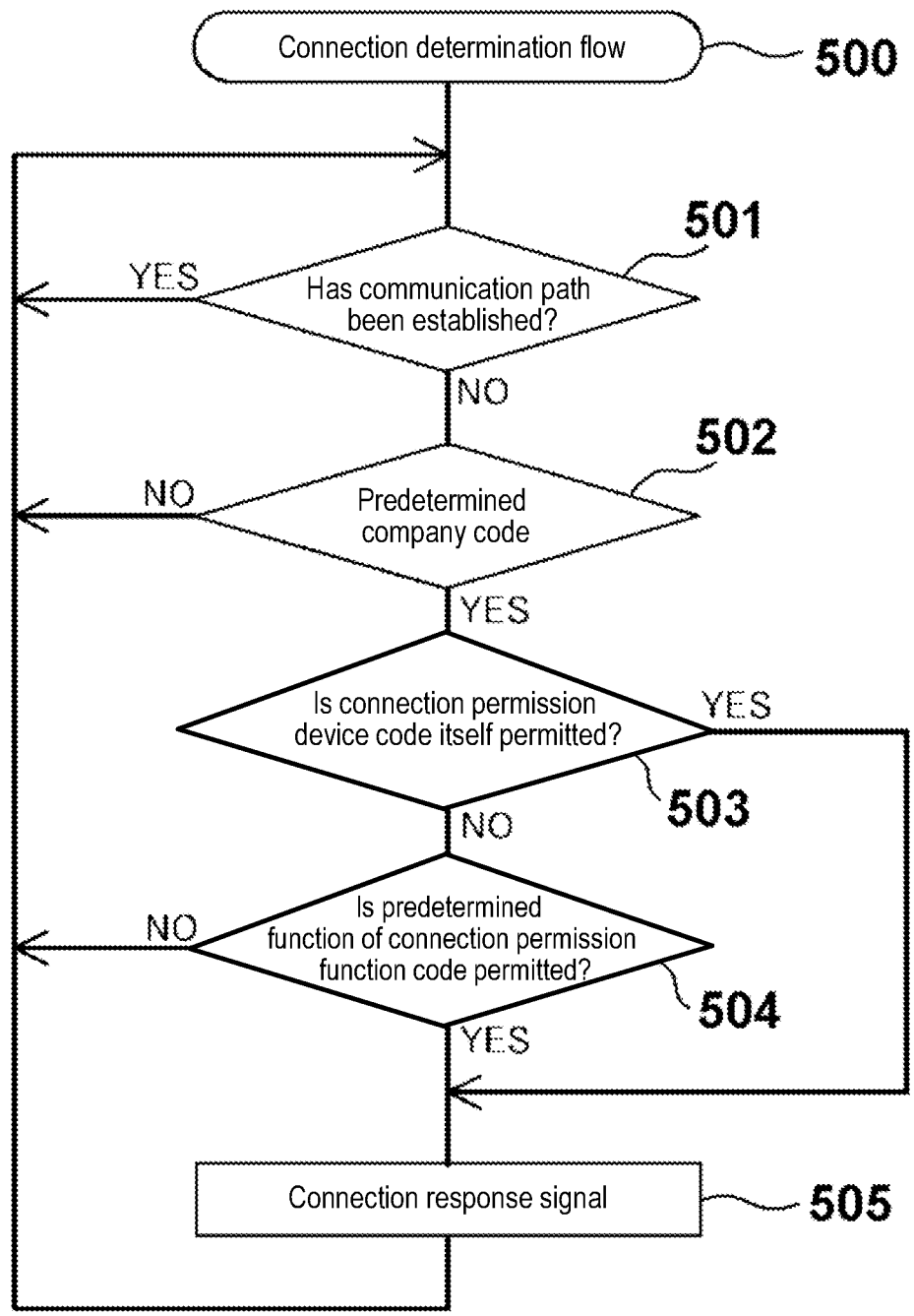
FIG. 5 is a flowchart showing an operation procedure at the time of establishing a communication path in the dust collector 200 or the information terminal 300 of FIG. 1.

FIG. 5 is a flowchart showing an operation procedure at the time of establishing a communication path in the dust collector 200 or the information terminal 300 of FIG. 1. The series of procedures (steps 500 to 505) shown in FIG. 5 can be executed by software in accordance with a program stored in advance in a MICOM (microcomputer) 251 included in the control part 250 of the dust collector 200 or the MICOM 311 included in the control part 310 of the information terminal 300, and are executed when wireless communication is possible. Hereinafter, FIG. 5 will be described assuming that the procedure is executed by the control part 250 of the dust collector 200.

First, the MICOM 251 of the dust collector 200 determines whether the communication part 270 (see FIG. 2) connected to the control part 250 has established a connection path (communication path) using wireless communication with any external electric device (step 501). Here, if the communication path has been established, standby is performed without executing the subsequent procedure shown in steps 502 to 505. A reason is that the wireless communication path of the present embodiment is on the premise of 1:1 connection. In the case of n:1 connection, steps 501 to 505 may be executed until an upper limit of n is reached. If the communication path has not been established in step 501, information ("connection condition information 510" to be described later in FIG. 6) necessary for connection that is received from the battery pack 1 as a connection candidate is subjected to discrimination, and it is determined whether a company code 520 among codes contained in the information corresponds to a predetermined company (step 502). The company code 520 is a kind of code for identifying a counterpart device, and is a manufacturer identification code in the case of an electric device such as an electric tool or a battery pack. Here, the "connection condition information" is held by a transmitting device (battery pack 1) that makes a connection request, and the "connection condition information" is transmitted to a receiving side during a connection attempt. When a receiving device (such as dust collector 200 and information terminal 300) receives the connection condition information 510, whether a connection response signal for the connection request can be transmitted is determined in accordance with a connection determination procedure in this flow. If connection is possible, the connection response signal for the connection request is returned; if connection is not possible, that is, if there is no connection target device applicable, no connection response signal for the connection request is returned.

Figure 6:
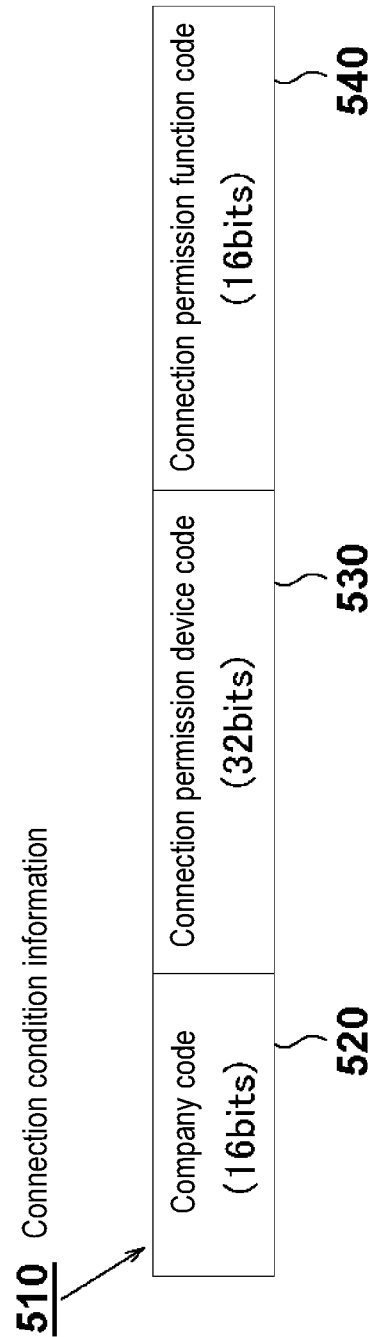
FIG. 6 illustrates connection condition information 510 stored in the battery pack 1 of FIG. 3.

Here, details of the connection condition information 510 held by the transmitting device are described with reference to FIG. 6 to FIG. 8. FIG. 6 illustrates the connection condition information 510 stored in the battery pack 1 of FIG. 3. The connection condition information 510 uses a total of 64 bits (8 bytes) of information composed of, from the beginning, the company code 520 of 16 bits, a connection permission device code 530 of 32 bits, and a connection permission function code 540 of 16 bits. The connection condition information 510 is information stored in advance in the storage device 52 included in the control part 50 by a manufacturer at the time of product manufacture and assembly. The connection condition information 510 is transmitted by the transmitting device (battery pack 1) that makes the connection request to the receiving device (dust collector 200) when the wireless communication path is established. The receiving device (dust collector 200) determines whether connection is possible from the received connection condition information 510 in accordance with the predetermined determination procedure, and, if connection is possible, transmits the connection response signal to the transmitting device (battery pack 1).

The company code 520 is identification information (manufacturer code) given to each manufacturer, and stores a manufacturer code of the electric device (dust collector 200) including the communication part 270 and the information terminal (information terminal 300) including the communication part 320 shown in FIG. 2. The receiving device that has received the connection condition information 510 is able to determine whether the transmitting device is a product of the same company that manufactures the receiving device or a product of another company according to the company code 520. In the case where the transmitting device is a smartphone, a tablet terminal, or an information terminal of a personal computer (PC), it is sufficient to store a code of a company that creates software (so-called application) stored in the information terminal instead of transmitting the company code of the terminal itself.

The connection permission device code 530 is information indicating a target device to be connected by the transmitting device (battery pack 1) that has made the connection request. When the receiving device (dust collector 200) receives the connection request together with the connection permission device code 530, it is determined by the receiving device whether the device itself (dust collector 200) is included in the connection permission device code 530, and whether the device itself is a connection target. Here, details of the connection permission device code 530 are described with reference to FIG. 7. The connection permission device code 530 is information held by the battery pack 1. Here, three types of information, namely connection conditions A to C, are confirmed. These conditions A to C are information in which the priority of connection is set. The condition A (531) indicates a connection group having the highest priority, and a bit string 536 "111000000 . . ." to be described later indicates whether each device (target device) corresponding to each bit is a connection target (=bit "1") or a non-connection target (=bit "0"). The bit string 536 "111000000 . . ." of the condition A (531) means that the target devices corresponding to the first to third bits are to be connected (bit "1"), and the target devices corresponding to the fourth and subsequent bits are not to be connected (bit "0"). The condition B532 (bit string 537) means that the target devices corresponding to the first to fourth bits are to be connected, and the target devices corresponding to the fifth and subsequent bits are not to be connected (bit "0"). The condition C (533) (bit string 538) means that the target devices corresponding to the first to fifth bits are to be connected, and the target devices corresponding to the sixth and subsequent bits are not to be connected (bit "0"). For example, in the case of the condition C (533), if the electric devices (dust collector A, dust collector B, lighting A and lighting B) corresponding to bits 0 to 3 are not within the wireless communication range, the information terminal 300 corresponding to bit 4 is to be connected. The load part corresponds to a motor of the dust collector A or the dust collector B or an illumination part of the lighting A or the lighting B.

Figure 7:
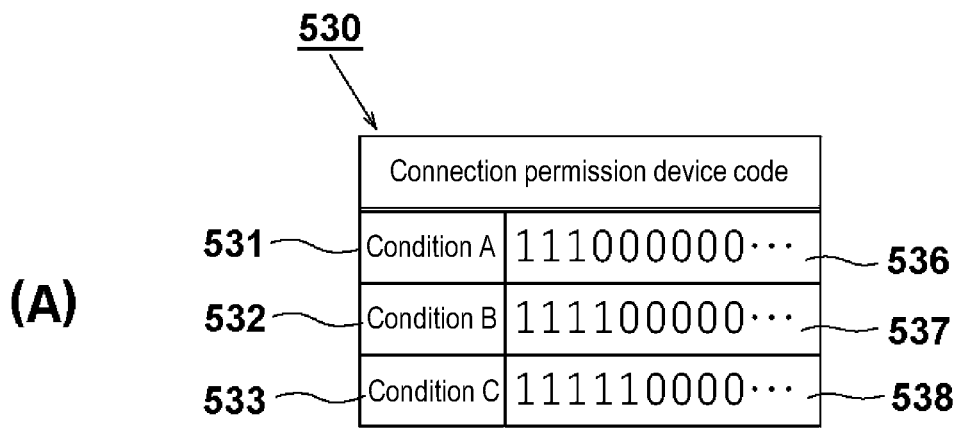
FIG. 7 illustrates details of a connection permission device code 530 of FIG. 6, in which (A) illustrates an example of stored data, and (B) is a data table showing a target device indicated by the stored data.

(B) of FIG. 7 is an illustration that further develops the content (bit strings 536 to 538) of the conditions A to C (531 to 533) of (A) of FIG. 7 to facilitate understanding. Here, what number bit 534 is is shown longitudinally, and target device 535 corresponding to each bit 534 is shown. Here, a combination of the bit 534 and the target device 535 is set in advance by a manufacturer of the receiving device (dust collector 200 or information terminal 300) connectable with the transmitting device (battery pack 1) or an application creator, and is separately stored in advance in the respective control parts. In the bit string 536 of the condition A (531) of (B) of FIG. 7, for each target device 535, "o" is shown if it is a connection target, and a blank is shown if it is not a connection target. If replacing this "c" with bit "1" and replacing the blank with bit "0", a bit string "111000-000 . . ." is obtained from top to bottom which has the same content as the bit string 536 of of (A) of FIG. 7. The same applies to the bit string 537 of the condition B (532) and the bit string 538 of the condition C (533) of (B) of FIG. 7. Regarding this, the manufacturer of the receiving device (dust collector 200 or information terminal 300) connectable with the transmitting device (battery pack 1) or the application creator pre-assigns o or x (blank) to a device performing priority connection as in (B) of FIG. 7, and this may be converted into a bit string like 536 to 538 of (A) of FIG. 7 and stored in advance in the control part of the transmitting device (battery pack 1).

Figure 8:
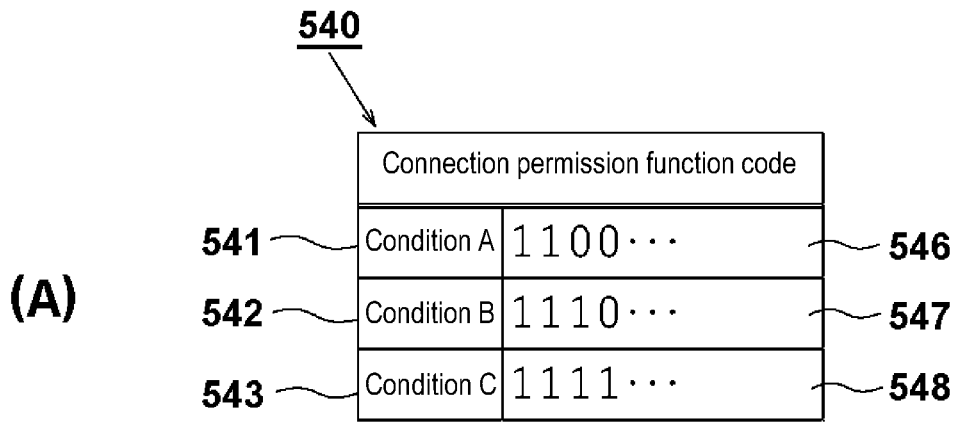
FIG. 8 illustrates details of a connection permission function code 540 of FIG. 6, in which (A) illustrates an example of stored data, and (B) is a data table showing a target function indicated by the stored data.

FIG. 8 illustrates details of the connection permission function code 540 of FIG. 6, in which (A) illustrates an example of stored data. The connection permission function code 540 is target function-related information held by the battery pack 1. Here, three types of connection conditions, namely conditions A to C (541 to 543), are stored in bit strings 546 to 548 that are the same as the bit strings 536 to 538 included in the connection permission device code 530. The condition A (541), the condition B (542), and the condition C (543) are information in which the priority of functions is set. The condition A (541) indicates a function group having the highest priority, and a bit string "1100 . . ." to be described later indicates whether each function corresponding to each bit is a function connection target (=bit "1") or a non-connection target (=bit "0"). The bit string "1100 . . ." of the condition A (541) means that the functions corresponding to the first to second bits are to be connected (bit "1"), and the functions corresponding to the third and subsequent bits are not to be connected (bit "0"). The condition B (542) means that the functions corresponding to the first to third bits are to be connected. The condition C (543) means that the functions corresponding to the first to fourth bits are to be connected (bit "1").

(B) FIG. 8 is an illustration that further develops the content (bit strings 546 to 548) of the conditions A to C (541 to 543) of (A) FIG. 8 to facilitate understanding. Here, what number bit 544 is is shown longitudinally, and target function 545 corresponding to each bit 544 is shown. Here, a combination of the bit 544 and the target function 545 is set in advance by the manufacturer of the receiving device (dust collector 200 or information terminal 300) connectable with the transmitting device (battery pack 1) or the application creator, and is separately stored in advance in the respective control parts. The target function is, for example, "dust collection interlocking" in which the dust collector 200 is operated in an interlocked manner with operation of the circular saw 100, "lighting interlocking" in which another lighting device (not shown) is turned on in accordance with operation of a driver drill (not shown), "application (execution) A" that operates in an interlocked manner with application software A to be executed by the receiving-side information terminal 300 as an electric device (not shown) operates, and "application (execution) B" that operates in an interlocked manner with application software B to be executed by the receiving-side information terminal 300 as an electric device (not shown) operates.

The "dust collection interlocking" is an operation mode in which, when the battery pack 1 detects operation ON information (for example, discharge current) of the electric device body connected therewith, the battery pack 1 wirelessly transmits an interlocking operation signal to a paired counterpart electric device. Specifically, as shown in FIG. 2, the battery pack 1 and the circular saw 100 are connected, and when the trigger switch 106 is operated (switched on), a discharge current flows from the battery pack 1 to a power supply path. This discharge current is detected by the shunt resistor 160 serving as the current detector, and a detection signal thereof is input to the control part 150. When receiving a discharge current signal, that is, start (driving) information of the circular saw 100, the control part 150 transmits information that the circular saw 100 is driven to the control part 50 of the battery pack 1 via the T terminals 146 and 46 for communication. When receiving the signal from the control part 150, the control part 50 transmits the interlocking operation signal to the dust collector 200 via the communication parts 70 and 270. Alternatively, since the battery pack 1 is also provided with the shunt resistor 49, the battery pack 1 may transmit the interlocking operation signal by detecting a discharge current by the battery pack 1 (control part 50) itself, or may transmit the interlocking operation signal in the case where a drive signal is received from the circular saw 100 and driving (discharge current) is detected by the battery pack 1 itself. In the dust collector 200 that has been paired, the motor 203 (see FIG. 2) is turned on when the interlocking operation signal is received, and the motor 203 is turned off when the interlocking operation signal disappears and no operation signal is received for a predetermined time (about several seconds to several tens of seconds). The "lighting interlocking" is that, when the battery pack 1 detects power ON information (or operation ON information) of the electric device body connected therewith, the battery pack 1 wirelessly transmits a lighting interlocking signal to a lighting fixture (example of electric device) (not shown). In the lighting fixture that has been paired, the lighting is turned on when the lighting interlocking signal is received, and the lighting is turned off when the signal disappears and no lighting interlocking signal is received for a predetermined time (about several seconds to several tens of seconds). The "application A" is set to have a higher connection priority than the "application B", and is set to have an automatic connection function. The automatic connection function is, for example, a function as follows. In the case where an application is launched with this function enabled, automatic scanning is performed without user operation, and a communication path is established if a connectable target is found. The "application B" has a lower connection priority than the application A. The "application B" has no automatic connection function, or the automatic connection function thereof has not been set.

(B) of FIG. 8 is a data table showing a target function indicated by the stored data. Here, in the condition A (541), for each target function 545, "○" (circle) is shown if it is a connection target, and a blank is shown if it is not a connection target. If replacing this "○" with bit "1" and replacing the blank with bit "0", a bit string "1100 . . . " is obtained from top to bottom which is the same information as in the field of the bit string 546 of (A) of FIG. 8. The same applies to the condition B (542) and the condition C (543) in (B) of FIG. 8. Regarding this, the manufacturer of the receiving device (dust collector 200 or information terminal 300) connectable with the transmitting device (battery pack 1) or the application creator pre-assigns ○ or x (blank) to a target function on which whether connection is possible is determined based on functions of the receiving device as in (B) of FIG. 8, and this may be stored in advance in the form of a bit string like 546 to 548 of (A) of FIG. 8 in the control part 50 (see FIG. 2) of the transmitting device (battery pack 1). That is, the information may be coded and set in a bit string as in (A) of FIG. 7 or (A) of FIG. 8 without the need to be stored in the form of a table as in (B) of FIG. 7 or (B) of FIG. 8. It is not assumed that a code update occurs as in (A) FIG. of FIG. 7 and (A) of FIG. 8 after shipment of the battery pack 1. However, since a wireless communication means is provided, it is also possible to configure the battery pack 1 so that the connection condition information 510 (see FIG. 6) can be updated via the information terminal 300.

Please refer back to step 502 in FIG. 5. The control parts 250 and 310 (both see FIG. 2) of the receiving device (such as dust collector 200 and information terminal 300) receive the connection condition information 510 shown in FIG. 6. If the company code 520 contained in the connection condition information 510 matches a predetermined code (YES in step 503), the control parts 250 and 310 next refer to the connection permission device code 530, and determine from the information contained therein whether the receiving device itself is permitted as a connection target, that is, whether the target device 535 of its own is in a permitted state indicated by ○ in the table of (B) of FIG. 7 (step 503). If permitted, the flow proceeds to step 505, and the connection response signal indicating that connection is possible is transmitted to the transmitting device (battery pack 1) (step 505). In step 503, if the receiving device itself, as the connection permission device code 530, is not permitted as the connection target, next, the transmitting device (battery pack 1) determines whether the target function 545 (see FIG. 8) executed by the transmitting device itself is a function designated by the information indicated by the received connection permission function code 540 (step 504). If the function is contained as the target function and to which connection is permitted, the connection response signal indicating that connection is possible is transmitted to the transmitting device (battery pack 1) (step 505). If not permitted in step 504, the flow returns to step 501.

As described above, since the control parts 250 and 310 (both see FIG. 2) of the receiving device (such as dust collector 200 and information terminal 300) are able to transmit the connection response signal to the transmitting device (battery pack 1) that has received a communication signal in accordance with the determination flow shown in FIG. 5 at the time of establishing Bluetooth® pairing, it is possible to connect devices that match each other in connection conditions.

Figure 9:
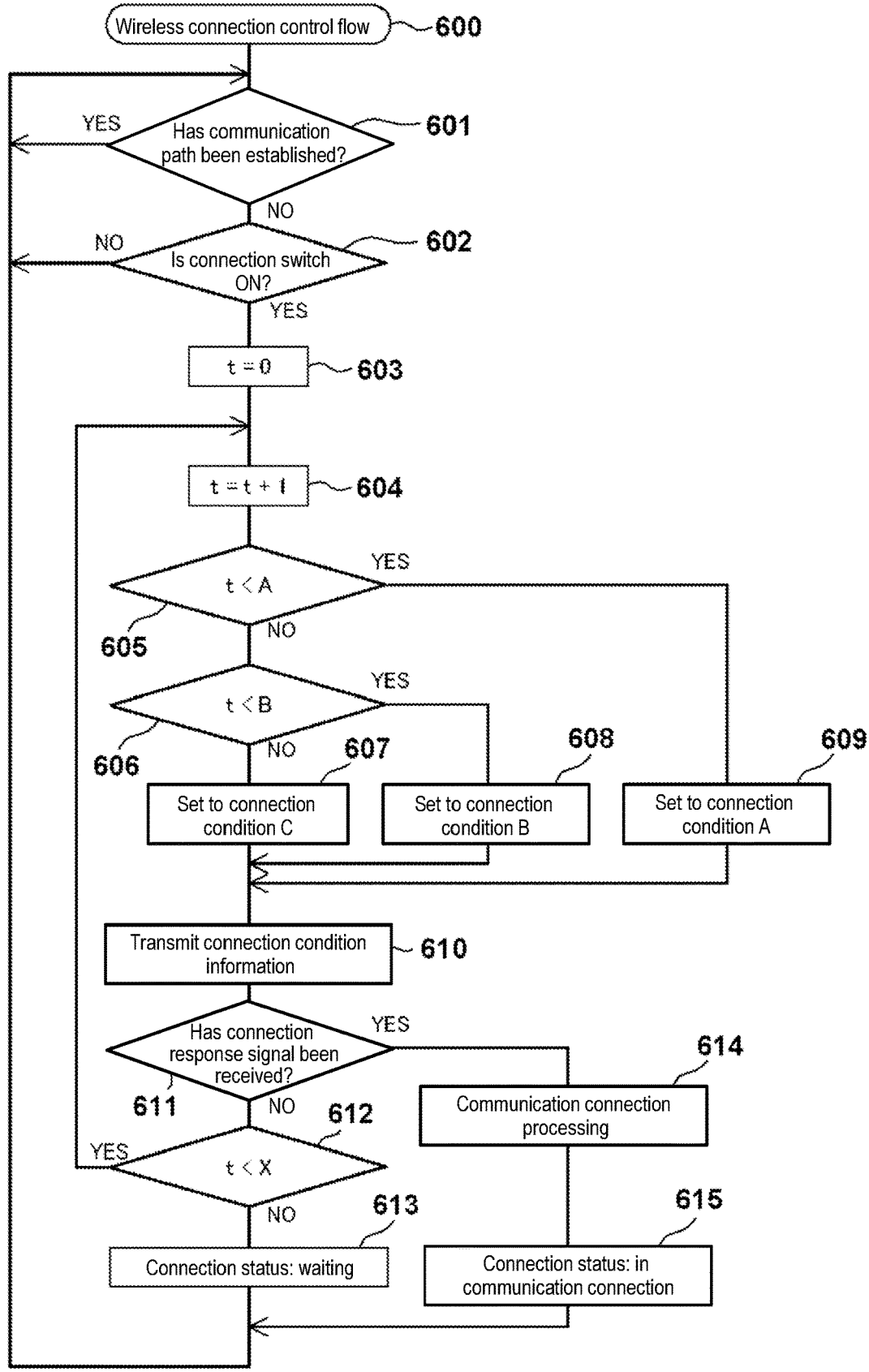
FIG. 9 is a flowchart showing an operation procedure of a battery pack according to an embodiment of the present invention when the battery pack is a peripheral.

FIG. 9 is a flowchart showing an operation procedure of the battery pack 1 according to an embodiment of the present invention when the battery pack 1 is a peripheral (transmission side). First, the control part 50 of the battery pack 1 itself has already established pairing with the receiving device (such as dust collector 200 and information terminal 300), and determines whether a communication path has been established (step 601). As described above, the battery pack 1 is set to 1:1 connection. In step 601, if communication connection with the receiving device has not been performed (if no communication path has been established), it is determined whether a connection switch (switch button 85) serving as the first operation part for wireless communication is ON (switched on) (step 602). If the connection switch is OFF in step 602, the flow returns to step 601. If the connection switch is ON in step 602, a counter t for counting time is cleared to zero (step 603).

Next, the MICOM 51 of the control part 50 increments the counter t by 1 (step 604). It is determined whether the incremented time is in any of an initial stage (t=0 to A), an intermediate stage (t=A to B), and a subsequent stage (t=B to X). Regarding this time, for example, X is set to 2 minutes, A serving as a first predetermined time is the first second, and B serving as a second predetermined time is about the second to third second. However, this time setting is arbitrary. In step 605, if t<A (initial stage) (YES in step 605), the control part 50 is set to adopt a first connection condition A (condition A (531) in FIG. 7 and condition A (541) in FIG. 8) (step 609). If not the initial stage in step 605

(NO in step 605), and if (A≤)t<B (intermediate stage) in step 606, the control part 50 is set to a second connection condition B (condition B (532) in FIG. 7 and condition B (542) in FIG. 8) (step 608). In step 606, if it is the remaining stage (B≤)t<X instead of the intermediate stage, the control part 50 is set to a third connection condition C (condition C (533) in FIG. 7 and condition C (543) in FIG. 8) (step 607).

Next, the MICOM 51 of the control part 50 transmits the connection condition information 510 in accordance with the connection conditions set in steps 607 to 609 (step 610). When the connection condition information 510 is transmitted to the receiving device, the control parts 250 and 311 of the receiving device (such as dust collector 200 and information terminal 300) transmit the connection response signal (step 505 in FIG. 5) only when the receiving device itself correspond to a connection target device. The control part 50 of the transmitting device (battery pack 1) determines whether the connection response signal from the receiving device has been received, and determines whether it is a target receiving device (dust collector 200 or information terminal 300) that matches the set connection condition (step 611). For example, if it is determined that the receiving device is the dust collector 200 by using the fact that the connection condition is the condition A (condition A (531) in FIG. 7) in step 609, since the condition A (531) is met, connection is possible. If the receiving device is the information terminal 300, since the condition A (531) is not met, connection is not possible. In step 611, when the target receiving device matching the set connection condition is found, the MICOM 51 of the control part 50 performs processing for communication connection with the counterpart (step 614), and a connection status is set to "in communication connection" ("communication established"), that is, a pairing state is achieved, and the flow returns to step 601 (step 615).

In step 611, if no target receiving device matching the set connection condition is found, it is determined whether the counter t has reached a timeout time X of the connection control procedure (step 612). If the counter t is less than X, the flow returns to step 604; if the counter t reaches or exceeds X, as a timeout, the connection status is set to "waiting" and the flows returns to step 601 (step 613).

As described above, by executing the procedure of wireless connection control shown in FIG. 9 by software, the battery pack 1 is able to preferentially connect to a device corresponding to the condition A. Even if a device corresponds only to the conditions B and C, it can be connected with priority over a device corresponding only to the condition C. According to the present embodiment, the receiving device (dust collector 200 or information terminal 300) is able to determine whether the receiving device itself is a connection target device, and the transmitting device (battery pack 1) that has received the connection response signal is able to appropriately determine from which device connection should be made. If there are two receiving devices with the same priority, for example, two dust collectors, the device with which communication is first established is to be connected.

Figure 10:
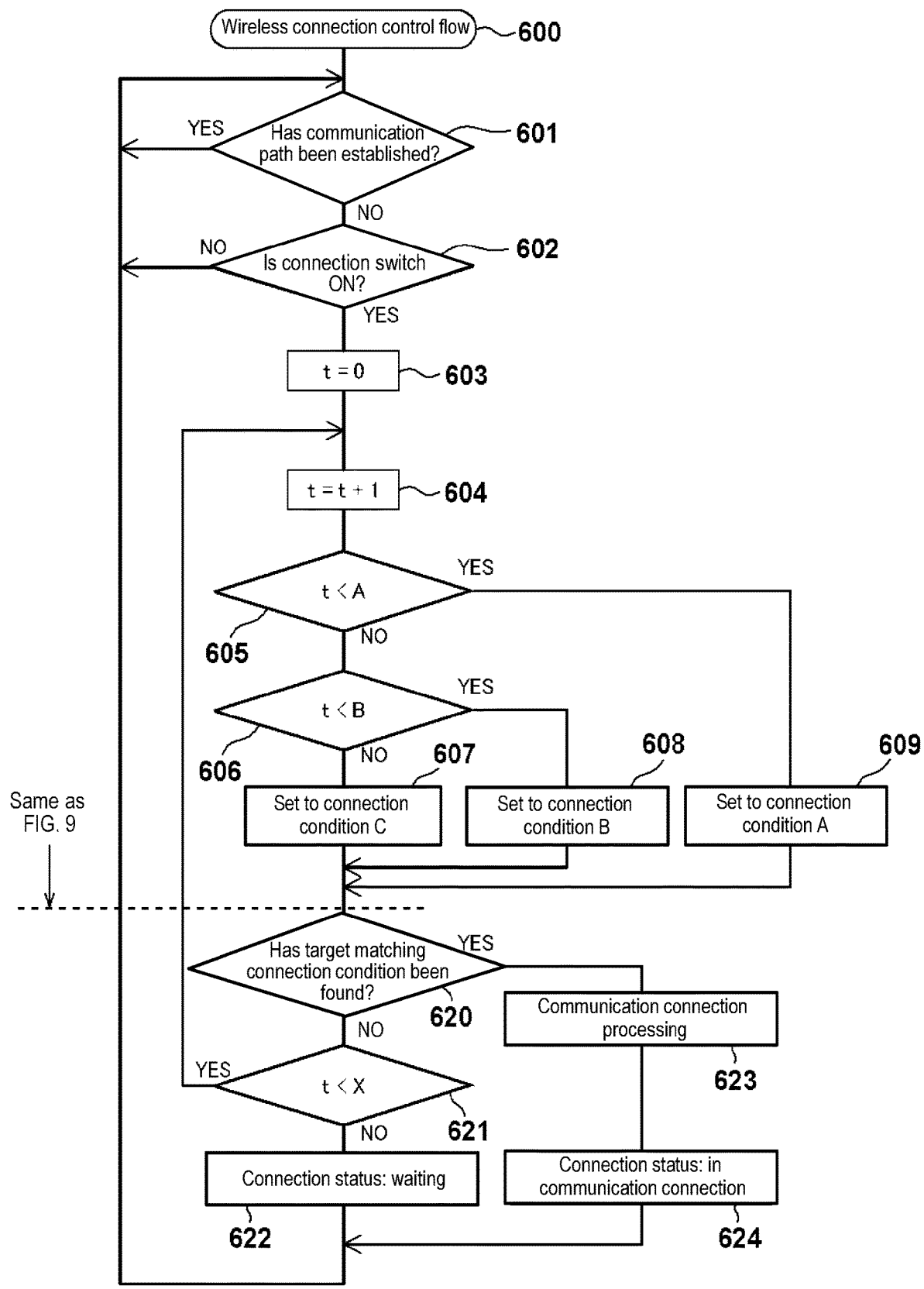
FIG. 10 is a flowchart showing an operation procedure of a battery pack according to an embodiment of the present invention when the battery pack is a central.

FIG. 10 is a flowchart showing an operation procedure of the battery pack 1 according to an embodiment of the present invention when the battery pack 1 shifts to the connection attempt state (scan). In the flowcharts of FIG. 5 and FIG. 9, the battery pack 1 is on a side (peripheral) making a connection attempt. However, it is possible that the dust collector 200 or the information terminal 300 becomes a peripheral, and the battery pack 1 becomes a receiving (central) device. In the case where the battery pack 1 is a central, steps 600 to 609 are the same in the procedure. After steps 607 to 609, the control part 50 receives the connection condition information 510. In step 620, determination is made on the connection condition information 510 received from a peripheral device (dust collector 200 or information terminal 300). It is determined whether a peripheral device matching the connection condition, that is, a target matching the connection condition, has been found (step 620). If found, communication connection processing is performed in which the MICOM 51 of the control part 50 performs the processing for communication connection with the counterpart (step 623). The connection status is set to "in communication connection" ("communication established"), that is, a pairing state is achieved, and the flow returns to step 601 (step 624).

In step 620, if no target receiving device matching the set connection condition is found, it is determined whether the counter t has reached the timeout time X of the connection control procedure (step 621). If the counter t is less than X, the flow returns to step 604; if the counter t reaches or exceeds X, as a timeout, the connection status is set to "waiting" and the flows returns to step 601 (step 622). In this way, even if the battery pack 1 is a receiving (central) device, appropriate determination can be made as to from which device connection should be made by using the connection condition information 510.

The present invention has been described above based on the embodiments. However, the present invention is not limited to the above embodiments, and various modifications can be made without departing from the spirit of the present invention. For example, if there is no electric device and there is an information terminal in the wireless communication range, the information terminal may be connected. Since the storage device 52 stores information about electric devices or information terminals that have been wirelessly connected (paired) in the past, in the case where there are multiple electric devices or information terminals within the wireless communication range, one that has been connected in the past may be preferentially connected. If there are multiple electric devices or information terminals that have been connected in the past, the priority may be determined in accordance with the conditions in FIG. 7. Although an electric tool or a dust collector has been mainly described as an example of the electric device, a battery pack may be used as an example of the electric device and battery packs may be wirelessly connected to each other. For example, in FIG. 2, the dust collector 200 may not include the communication part 270, and, in place of the battery pack 1A, the battery pack 1 equipped with the communication part 70 may be connected to the dust collector 200. By pressing and holding the switch button 85 of each of the battery pack 1 connected to the dust collector 200 and the battery pack 1 connected to the circular saw 100, wireless connection can be established between both battery packs 1. In FIG. 1, in the case where a lighting device equipped with the battery pack 1 having a built-in wireless function is provided in place of the information terminal 300, by simultaneously pressing the switch buttons 85 of both the battery pack 1 mounted on the lighting device and the battery pack 1 mounted on the circular saw 100, the wireless connection between the battery packs 1 may be prioritized over the connection with the dust collector 200 or the information terminal 300. That is, connection can be performed so as to give priority to the electric devices on which an operation for wireless connection has been performed most recently. Alternatively, after canceling the interlocking mode by the pairing switch 255 of the dust collector 200, by pressing the switch button 85 of the battery pack 1 mounted on the lighting device or by pressing the switch button 85 of both battery packs 1, wireless communication between both battery packs 1 may be established. Alternatively, wireless communication may be established in accordance with the priority shown in FIG. 7 to FIG. 10 described above. If the priority of the wireless connection with the battery pack 1 having the built-in wireless function as the electric device is raised, since another electric device that is able to communicate with the mounted battery pack 1 in history information or the like and has no wireless function can be used, usability of the electric device system can be improved. Since the frequency of use of a user owned electric device or multiple electric devices differs depending on the user, if the priority suitable for each user can be set arbitrarily by the user or the manufacturer and is not limited to the connection between battery packs, the usability of the electric device system can be further improved.

What is claimed is:

1. A battery pack comprising:
   a battery cell;
   a control part, connected to the battery cell; and
   a wireless communication part, connected to the control part and configured to perform wireless communication with an external device by the control part, wherein
   in a state in which an information terminal as the external device and an electric device comprising a load part as the external device are wirelessly connectable to the battery pack, the battery pack is configured to give priority to establishing wireless connection with the electric device over the information terminal.

2. The battery pack according to claim 1, wherein
   the battery pack comprises a first operation part that switches to a wireless connection standby state;
   the electric device comprises a second operation part that switches to the wireless connection standby state;
   the battery pack is configured so that, in response to the electric device being switched to the wireless connection standby state by operation of the second operation part in a range enabling wireless connection with the battery pack while the information terminal is in the wireless connection standby state in the range enabling wireless connection with the battery pack, the battery pack establishes wireless connection with the electric device without establishing wireless connection with the information terminal.

3. The battery pack according to claim 2, wherein
   the battery pack connects with the information terminal if the electric device is not within a wireless communication range.

4. The battery pack according to claim 3, wherein
   if the electric device and the information terminal are in the wireless communication range, the battery pack preferentially connects to one that has been connected in the past.

5. The battery pack according to claim 2, wherein
   if the electric device and the information terminal are in a wireless communication range, the battery pack preferentially connects to one that has been connected in the past.

6. The battery pack according to claim 1, wherein
   the battery pack connects with the information terminal if the electric device is not within a wireless communication range.

7. The battery pack according to claim 6, wherein
   if the electric device and the information terminal are in the wireless communication range, the battery pack preferentially connects to one that has been connected in the past.

8. The battery pack according to claim 1, wherein
   if the electric device and the information terminal are in a wireless communication range, the battery pack preferentially connects to one that has been connected in the past.

9. The battery pack according to claim 1, comprising:
   an operation part, giving a wireless connection instruction for the wireless communication part, wherein
   a connection path with the external device is established by operation of the operation part.

10. The battery pack according to claim 9, wherein
    in establishing the connection path, the battery pack changes a connection condition with the external device depending on an elapsed time from when the operation part is operated.

11. The battery pack according to claim 10, wherein
    the connection condition comprises at least one of:
    a first connection condition for permitting connection with a portion of the external device during a period from when the operation part is operated until a first predetermined time elapses;
    a second connection condition for permitting connection with another portion of the external device during a period from when the first predetermined time elapses until a second predetermined time elapses; and
    a third connection condition for permitting connection with yet another portion of the external device during a period from when the second predetermined time elapses until a timeout occurs.

12. The battery pack according to claim 11, wherein
    in response to a failure to establish the connection path with the external device during a period from when a procedure for establishing the connection path is started until a time when the timeout occurs, the operation part is returned to a standby state before operation.

13. The battery pack according to claim 10, wherein
    the connection condition comprises a manufacturer code, and
    the external device that does not match the manufacturer code is not to be connected.

14. The battery pack according to claim 13, wherein
    the connection condition comprises target device information and target function information;
    whether connection is permitted or not is first determined based on the target device information, and if not permitted, whether connection is permitted or not is determined based on the target function information.

15. The battery pack according to claim 1, wherein
    the priority of wireless connection with the external device is changeable.

16. A battery pack comprising:
    a battery cell;
    a control part, connected to the battery cell;
    a wireless communication part, connected to the control part and controlled to perform one-to-one wireless communication with an external device by the control part; and
    an operation part, giving a wireless connection instruction for the wireless communication part, wherein
    the wireless communication part is configured to perform connection in descending order of priority of the external device to be connected and in establishing a connection path with the external device by operation of the operation part, the battery pack changes a connection condition with the external device depending on an elapsed time from when the operation part is operated.

17. The battery pack according to claim 16, wherein
the external device is an electric device comprising a load part, or an information terminal;
the battery pack is configured to give priority to connecting with the electric device over the information terminal.

18. The battery pack according to claim 16, wherein
the priority of wireless connection with the external device is changeable.

19. An electric device system comprising:
the battery pack according to claim 1;
an electric device, comprising a load part, and a device-side wireless communication part capable of wireless communication with the wireless communication part of the battery pack.

20. The electric device system according to claim 19, comprising:
a wireless terminal, comprising a terminal-side wireless communication part capable of wireless communication with the wireless communication part of the battery pack.

\* \* \* \* \*